(12) United States Patent
Foote

(10) Patent No.: US 9,121,246 B2
(45) Date of Patent: Sep. 1, 2015

(54) BLOWOUT PREVENTER HAVING WEAR, SEAL AND GUIDE PLATE INSERTS

(76) Inventor: Dean Foote, Edmonton (CA)

(*) Notice: Subject to any disclaimer, the term of this patent is extended or adjusted under 35 U.S.C. 154(b) by 125 days.

(21) Appl. No.: 12/853,613

(22) Filed: Aug. 10, 2010

(65) Prior Publication Data

US 2011/0031421 A1 Feb. 10, 2011

Related U.S. Application Data

(60) Provisional application No. 61/232,647, filed on Aug. 10, 2009.

(51) Int. Cl.
*E21B 33/06* (2006.01)
*F16C 29/02* (2006.01)

(52) U.S. Cl.
CPC .............. *E21B 33/062* (2013.01); *F16C 29/02* (2013.01); *Y10T 29/49407* (2015.01)

(58) Field of Classification Search
CPC ............................... E21B 33/062; F16C 29/02
USPC ............ 251/1.1, 1.3, 93, 100–102, 110–113; 166/82.1, 85.4; 175/209; 277/322; 384/7, 26, 29–33, 42, 99, 129, 276
See application file for complete search history.

(56) References Cited

U.S. PATENT DOCUMENTS

| 1,709,949 | A |   | 4/1929 | Rasmussen |
|---|---|---|---|---|
| 3,537,762 | A | * | 11/1970 | Lodige ............................ 384/42 |
| 3,744,749 | A | * | 7/1973 | Le Rouax ....................... 251/1.3 |
| 3,871,613 | A | * | 3/1975 | LeRouax ........................ 251/1.3 |
| 3,885,837 | A | * | 5/1975 | Mellor ............................ 384/42 |
| 4,526,339 | A | * | 7/1985 | Miller ............................ 251/1.3 |
| 4,541,606 | A | * | 9/1985 | Williams, Jr. .................. 251/1.3 |
| 4,638,972 | A | * | 1/1987 | Jones et al. .................... 251/1.3 |
| 4,938,290 | A | * | 7/1990 | Leggett et al. ................ 166/387 |
| 5,044,602 | A |   | 9/1991 | Heinonen |
| 6,063,333 | A | * | 5/2000 | Dennis .............................. 419/6 |
| 7,464,765 | B2 | * | 12/2008 | Isaacks et al. ................ 166/378 |
| 2007/0063403 | A1 | * | 3/2007 | Stark ............................. 269/309 |
| 2008/0135791 | A1 | * | 6/2008 | Juda et al. ..................... 251/1.3 |
| 2009/0050828 | A1 | * | 2/2009 | Edwards ....................... 251/1.3 |

FOREIGN PATENT DOCUMENTS

CA    2 506 828 C    10/2006

* cited by examiner

*Primary Examiner* — Marina Tietjen
*Assistant Examiner* — Seth W Mackay-Smith
(74) *Attorney, Agent, or Firm* — Christensen O'Connor Johnson Kindness PLLC (57) ABSTRACT

A method of preventing wear in a blowout preventer includes the steps of forming an inner surface of a blowout preventer body to receive wear inserts at least one wear point in the blowout preventer body; and securing at least one wear insert on the formed inner surface of the blowout preventer body.

24 Claims, 7 Drawing Sheets

BLOWOUT PREVENTER HAVING WEAR, SEAL AND GUIDE PLATE INSERTS

FIELD

This relates to the internal operating surfaces of a blowout preventer for oil field operations, namely, a blowout preventer having wear, seal and guide plate inserts.

BACKGROUND

A blowout preventer is basically a pressure vessel with moving parts, both inside and out. A key portion of the pressure vessel is the body. The body must have sufficient strength to contain pressured well fluids, (as a pressure vessel), and supply a guide and sealing means for the moving internal parts.

These two functions are contradictory in material requirements. To serve as a pressure vessel, the body and ram block material must meet certain specifications to resist stress cracking in the presence of such chemicals as hydrogen sulphide. This typically means that the material must be relatively soft. Unfortunately, this soft material must also provide a guide and seal means for the moving ram blocks in the extremely abrasive environment of the well fluid. Solving the deterioration of the contacting surfaces would normally require harder, more abrasive resistant materials. These materials however, are either expensive or do not meet the specifications of the soft materials to meet the requirements to resists stress cracking.

The normal practice is to manufacture the body, (pressure vessel), and the ram blocks from softer materials to meet stress cracking specifications, and repair all parts when necessary as they wear. The repair of the material of these components requires a specific weld procedure that is expensive. In addition, the weld material must also be soft and wears as readily as the original material.

Typically, the body is weld repaired several times over without regard to the consequences to the parent material when subjected to the numerous heat cycles involved. A weld repair is a fusion process that involves heat applied to the parent material in excess of it's' "critical" temperature to fuse with the added weld material to the parent material. Repeated cycles of this nature can permanently change the structure of the parent material and lead to a host of other problems.

There are a number of solutions that have been attempted, but for various reasons, have been unable to solve the soft and hard material preferences for this application. One solution was to weld apply hard surfacing to the parent material where the moving ram blocks contacted the body. This process was unsuccessful due to the expense and inability to meet the material requirements to resist cracking. Because hard surfacing is a fusion process, the hard material becomes a part of the body and must meet the same property specifications to resist cracking. Unfortunately hard surfacing materials would not pass some specific requirements, usually associated with crack initiation. With fusion processes, cracks that initiate in the hard surfacing may propagate through to the parent material, the body, which is to be protected from cracks. Another process that has been attempted to improve the wear of the mating surfaces is an infusion process that relies on a heated gas process to harden a thin layer of the parent material of the body. As in welding hard surfacing material to the parent material, the infusion process also becomes part of the body, or pressure vessel, and must meet all of the required specifications. Testing suggests that not only does the hardened layer not meet specifications, but also suggests that cracks could be initiated at lower stresses than the parent material. Again, crack propagation into the parent material from the hardened surface is of major concern for a pressure vessel.

A more effective system has been used that provides a replaceable seal seat. It is locked into position with a sprung ring and setscrew arrangement that locks an "o-ring" sealed seat into position. The major problem with this arrangement is that it often corrodes and may be extremely difficult to remove.

SUMMARY

There is provided a method of preventing wear in a blowout preventer, comprising the steps of: forming an inner surface of a blowout preventer body to receive wear inserts at least one wear point in the blowout preventer body; and securing at least one wear insert on the formed inner surface of the blowout preventer body.

According to another aspect, the wear point may be a contact point between a moving component and the blowout preventer body. One or more wear inserts may be of a harder material than the blowout preventer body. The wear inserts may be secured using at least one of a pin connection and an adhesive.

According to another aspect, forming an inner surface may comprise forming a wear plate cavity around a tubular bore below a travel path of a ram block, and securing at least one wear insert may comprise securing a wear plate in the cavity, the wear plate engaging a bottom surface of the ram block in the closed position. At least one of the wear plate cavity and the wear plate may have flow channels to permit flow between the wear plate and the blowout preventer body. The wear plate may have a raised portion that raises the ram block in the closed position into a sealing engagement with a seal above the ram block.

According to another aspect, forming an inner surface may comprise forming a threaded cavity around a tubular bore above a travel path of a ram block, and securing at least one wear insert may comprise threading a seal insert into the threaded cavity, the seal insert engaging a top surface of the ram block in the closed position. The threaded cavity may comprise a rounded thread and the seal insert comprises a square thread. The seal insert may comprise at least one port for injecting a fill compound between the square thread and the rounded thread. An elastomeric seal may be positioned between the threaded cavity and the seal insert.

According to another aspect, forming an inner surface may comprise forming guide cavities along the sides of a ram block travel path, and securing at least one wear insert may comprise inserting ram block guides into the guide cavities, the ram block guides engaging the sides of the ram block as it moves along at least a portion of the ram block travel path.

According to another aspect, the method may further comprise the step of forming a ram shaft seal cavity in an outer surface of the blowout preventer body and inserting a ram shaft seal into the ram shaft seal cavity, the ram shaft seal engaging the ram shaft as it moves relative to the blowout preventer body.

According to another aspect, there is provided a blowout preventer formed by the method described above.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
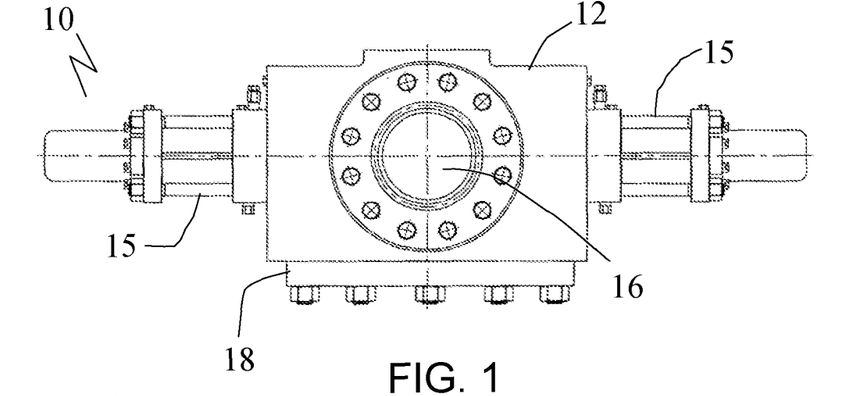
FIG. 1 is a top plan view of a blowout preventer.
Figure 2:
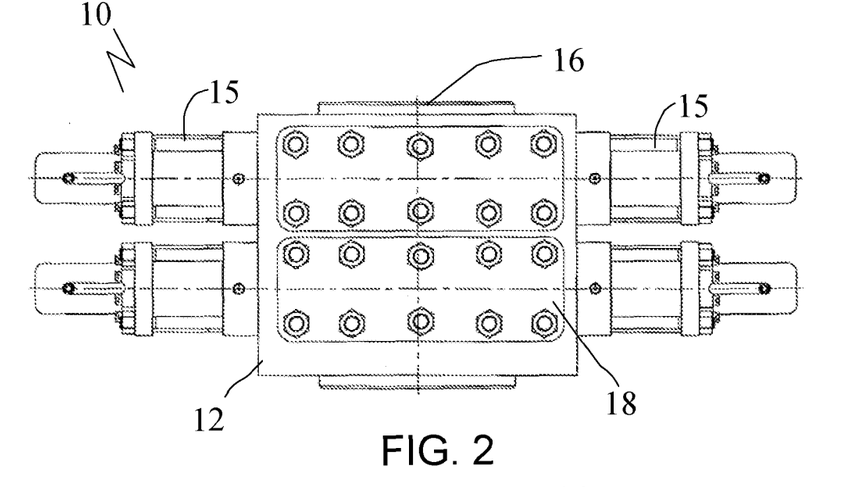
FIG. 2 is a side elevation view of a blowout preventer.
Figure 3:
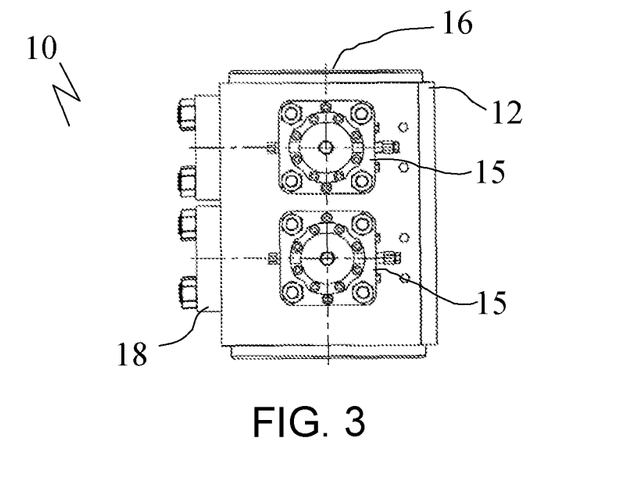
FIG. 3 is an end elevation view of a blowout preventer.
Figure 4:
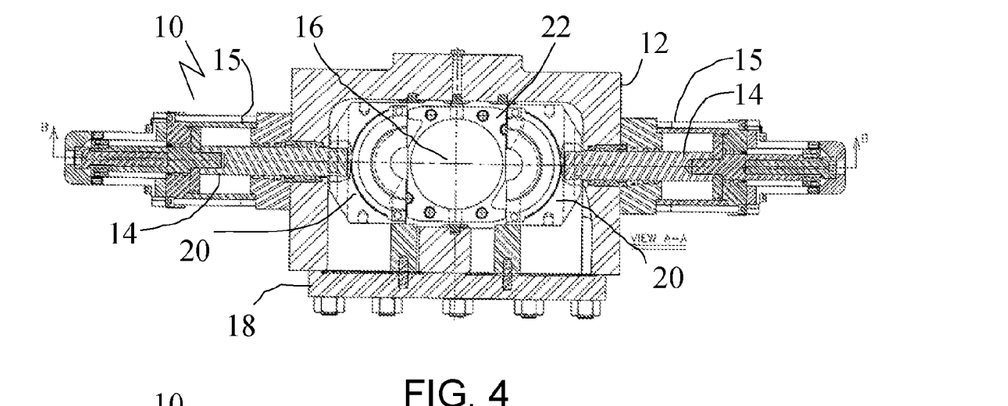
FIG. 4 is a top plan view in section of the blowout preventer in an open position.

In the drawings, the blowout preventer is indicated by reference numeral 10. Referring to FIG. 1 through 3, the blowout preventer 10 has a body 12, ram shafts 14 (shown in FIG. 4) controlled by actuators 15, a tubular bore 16 for receiving a tubular member (not shown), and a removable pressure plate 18 that covers an access opening into the inner cavity of the body 12. While there are four ram shafts 14 in the double-gate configuration depicted, single, triple, etc gate designs may also be used. Referring to FIG. 4, the ram shafts 14 control ram blocks 20, which close about tubular members that pass through the tubular bore 16.

The approach described below is to allow the material of the body 12 to perform its function as a pressure vessel with its relatively soft material, as specifications dictate, and provide other components specifically designed for abrasive resistance to provide the running surfaces for the internal moving parts. In other words, accommodate the moving parts without allowing them to contact the soft pressure-containing body material and eliminate abrasive wear damage to the body.

As depicted, the body 12 has been formed to accommodate removable and replaceable inserts. The inserts are specifically designed to protect the body 12 and resist abrasive wear during all of the necessary operating functions of a blowout preventer. As described below, inserts may be provided as the running surface for the ram blocks, the seal surface for the rubber parts, inserted into the ram blocks, a guide means for the ram block movement and finally, to contain the ram blocks when subjected to pressure, such as during closing. Each insert will now be discussed in detail as they relate to each gate.

Skid Plate 22

Figure 5:
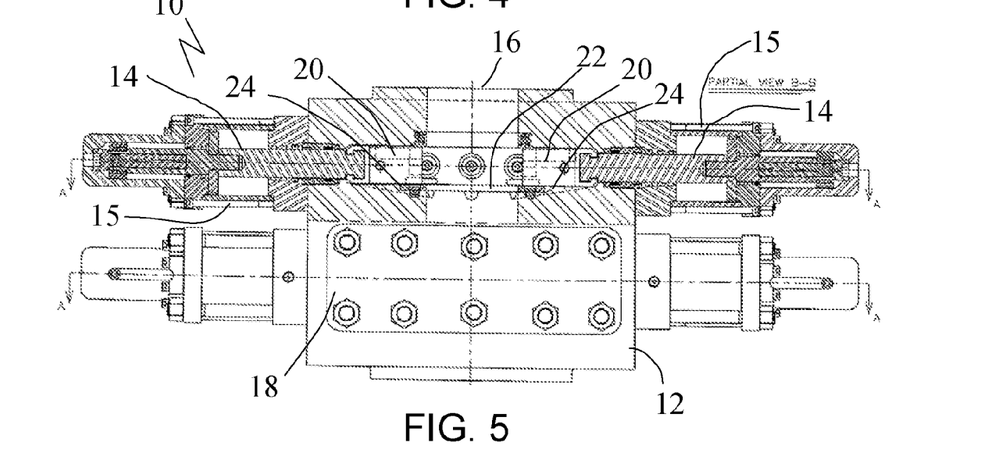
FIG. 5 is a side elevation view in partial section of the blowout preventer in an open position.
Figure 6:
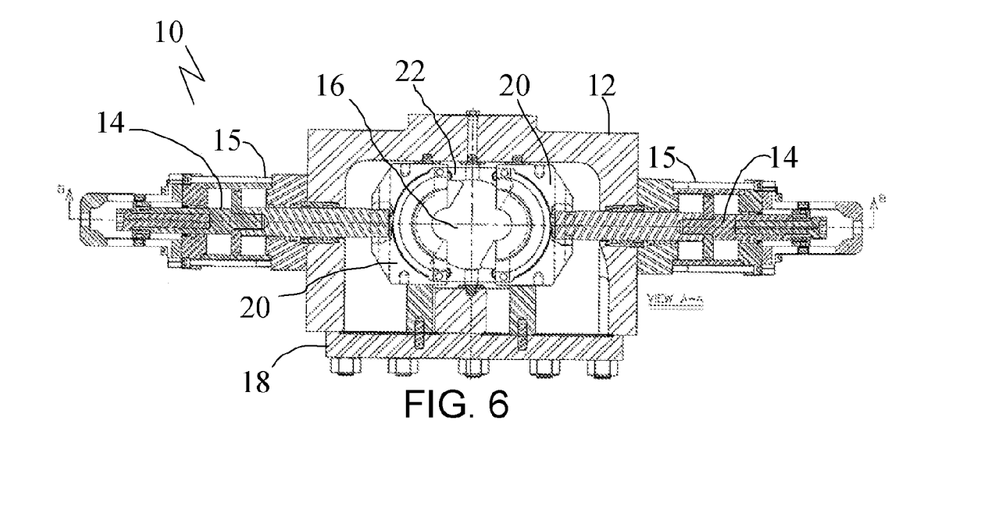
FIG. 6 is a top plan view in section of the blowout preventer in a partially closed position.
Figure 7:
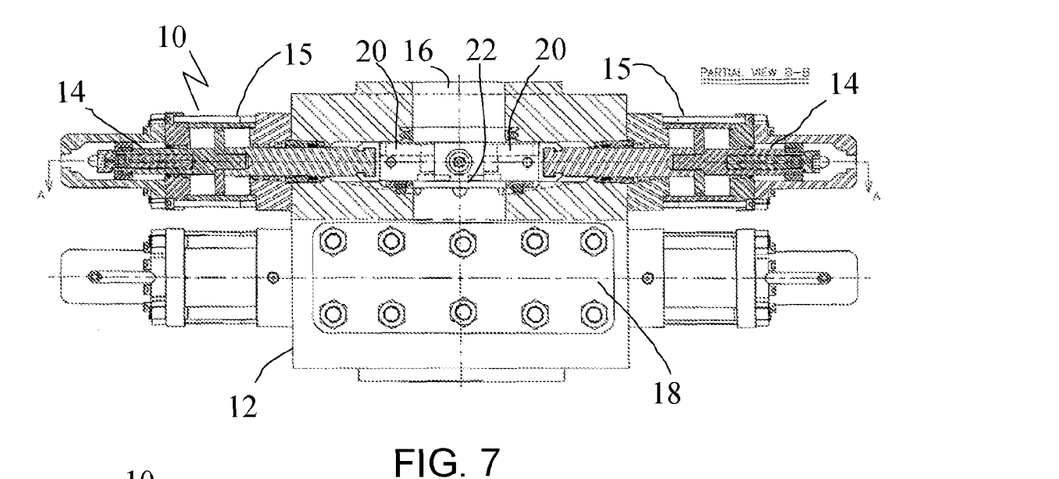
FIG. 7 is a side elevation view in partial section of the blowout preventer in a partially closed position.

Referring to FIGS. 4 and 5, a skid plate 22 is provided to protect the body 12 from the bottom side 24 of the ram blocks 20. It has an opening that matches the blowout preventer opening 16 through which pipe moves during well operations. The plate 22 may be configured many ways, such as smaller individual parts, but the preferred embodiment uses a single plate to accommodate both ram blocks closing from opposite sides of the opening 16, as shown in FIGS. 6 and 7. This ensures that the ram blocks 20 exert equal and opposite forces on the skid plate 22 from either side as they close and open.

Figure 10:
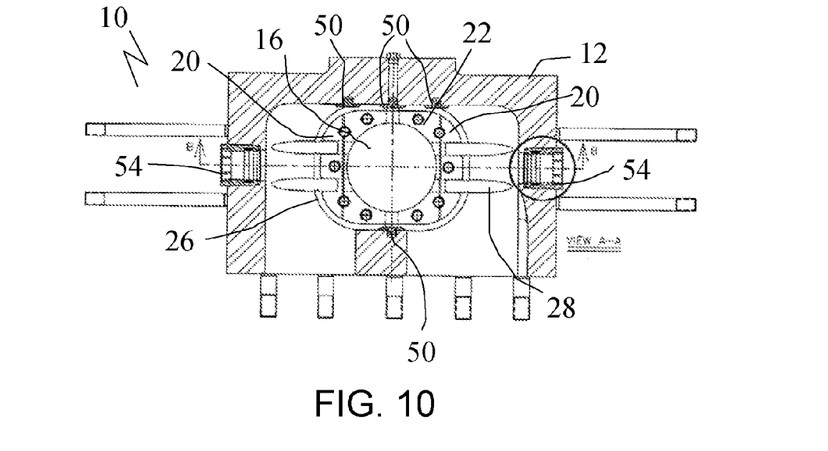
FIG. 10 is a top plan view in section of the blowout preventer with the pressure plate and ram shafts removed.
Figure 14:
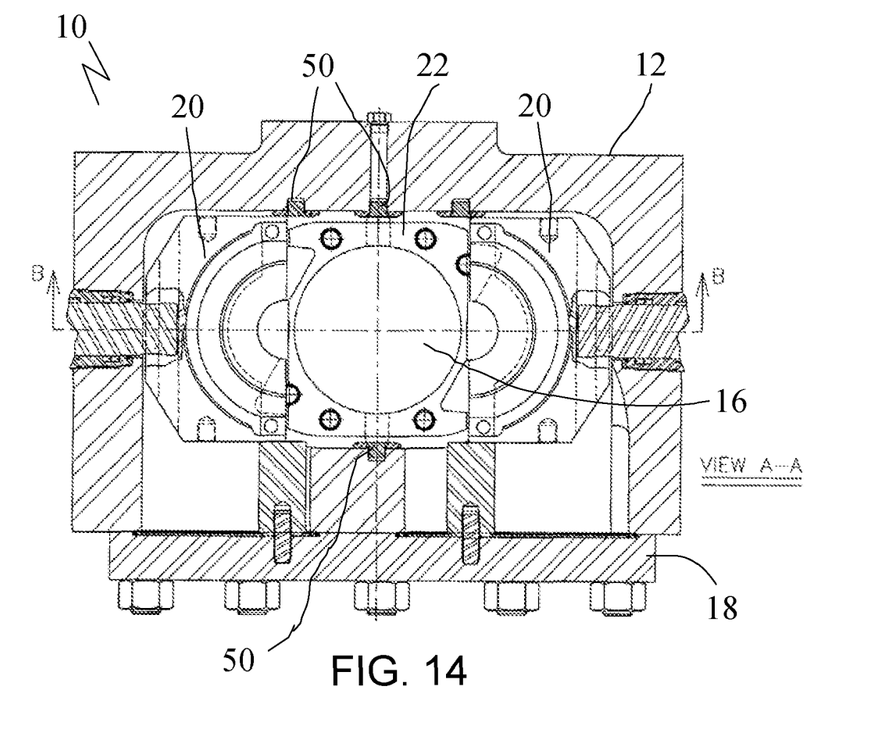
FIG. 14 is a detailed top plan view in section of an interior cavity of the blowout preventer.
Figure 15:
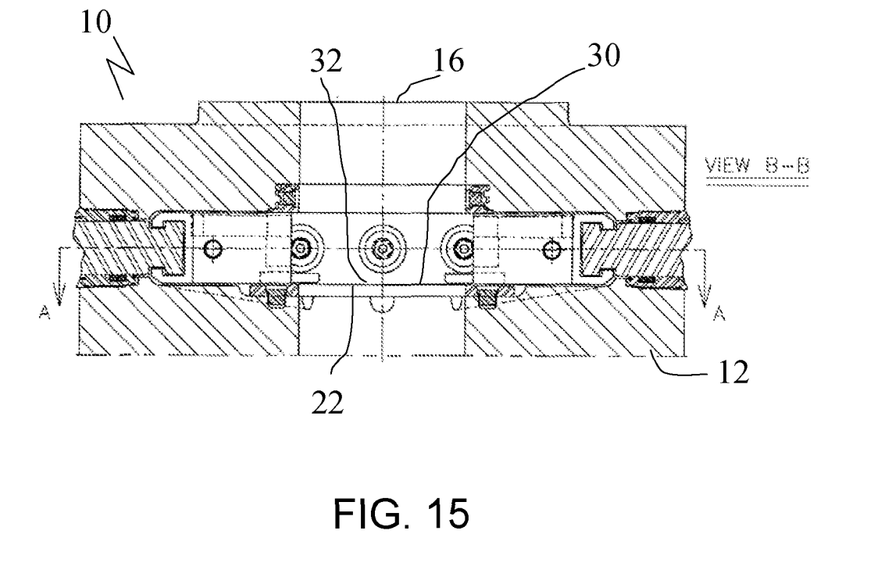
FIG. 15 is a detailed side elevation view in section of an interior cavity of the blowout preventer.
Figure 16:
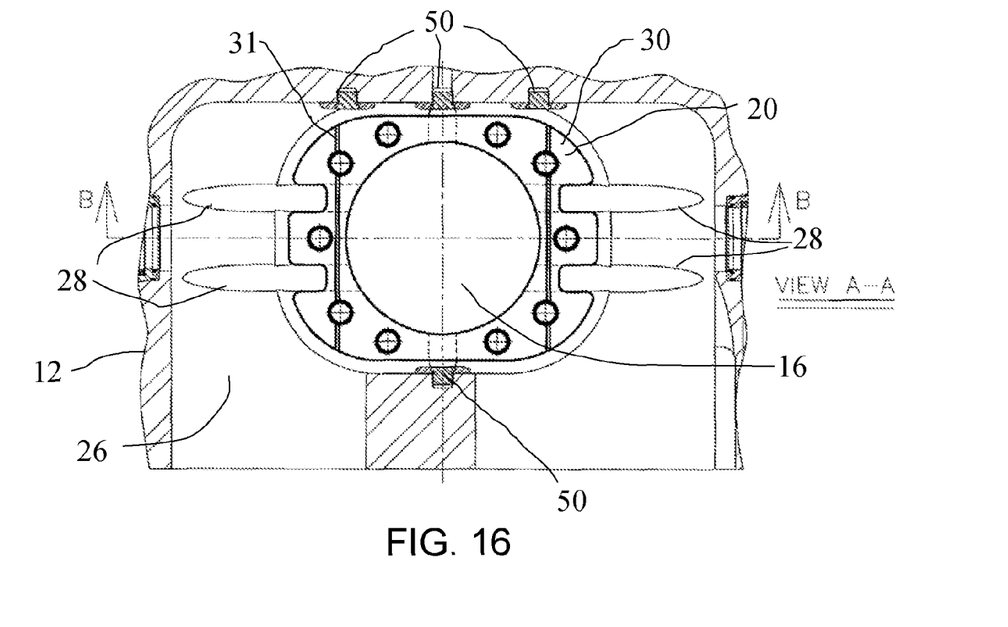
FIG. 16 is a is a detailed top plan view in section of an interior cavity of the blowout preventer.
Figure 17:
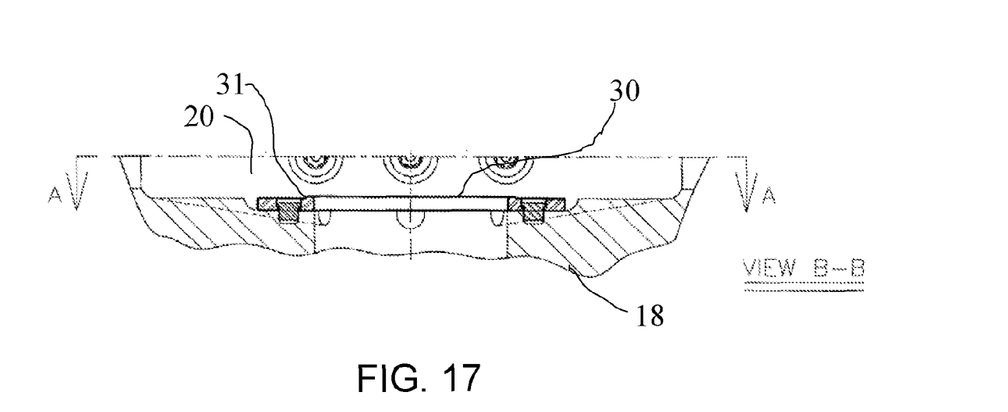
FIG. 17 is a detailed side elevation view in section of an interior cavity of the blowout preventer.

Referring to FIG. 10, the surface 26 of the body 12 that contacts the under side of the skid plate 22 is flat with flow channels 28 formed, such as by milling, into the surface 26 to allow fluid to pass under the skid plate 22 to the cavities behind the ram blocks 20 as they close and open. As shown, the skid plate 22 is preferably formed, such as by machining, to match these flow channels 28 to ensure there is no blockage. This configuration allows the plate 22 to be manufactured in a manner that allows easy removal and insertion of the ram blocks 20 through the access openings behind the pressure plate 18. Referring to FIG. 16 and FIG. 17, the top surface 30 of the plate is preferably recessed such as by milling toward either side to allow extra clearance for the ram blocks 20 to be removed and installed when the pressure plate 18 is removed, for example as shown in FIG. 14 and FIG. 15. When the ram blocks are closed, they move up the ramp 31 formed by milling the top surface 30 to the engage surface 32 toward the middle of plate 22. The area of the engage surface 32 is larger than conventional methods and is preferably continuous in nature.

Conventional methods generally rely on three integrally formed strips of body material, called skids, to provide the correct height for the blocks due to the flow channels in the body. These skids often wear, and wear into the blocks, due to the sliding operation of the ram blocks in the presence of abrasive well bore fluids. In addition, the ram block material is of a similar, if not the same, material as the skids. When two like steels rub against each other, they may pick-up or gaul causing damage and further wear. Many processes have been tried to provide a harder running surface for the skids, but because they are part of the pressure vessel, i.e. the body 12, they must conform to the appropriate specifications to prevent cracking.

In this design, the skid plate 22 is not part of the pressure containing body. As it is a separate component, it may therefore be hardened to resist abrasive wear without affecting the pressure containing material requirements of the body 12 as any cracks in the skid plate will not propagate through to body 12.

Seal Insert 34

Figure 9:
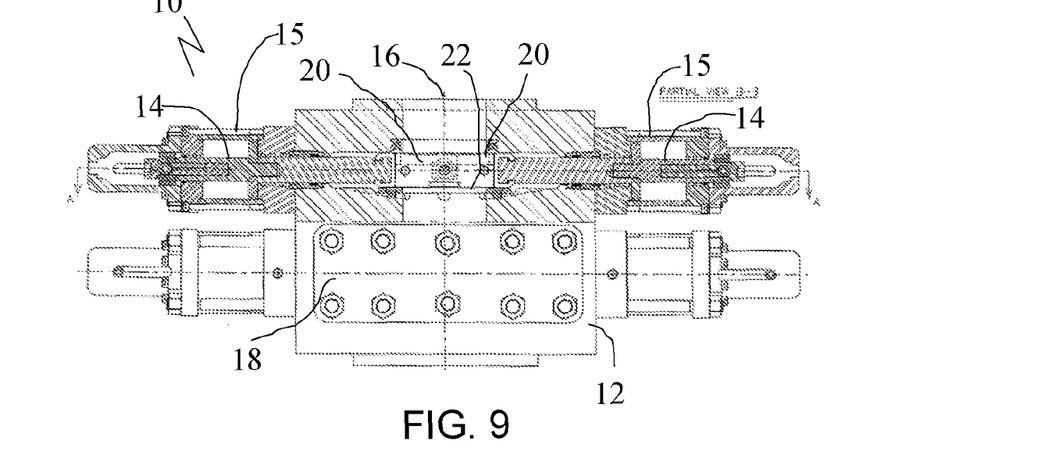
FIG. 9 is a side elevation view in partial section of the blowout preventer in a closed position.
Figure 18:
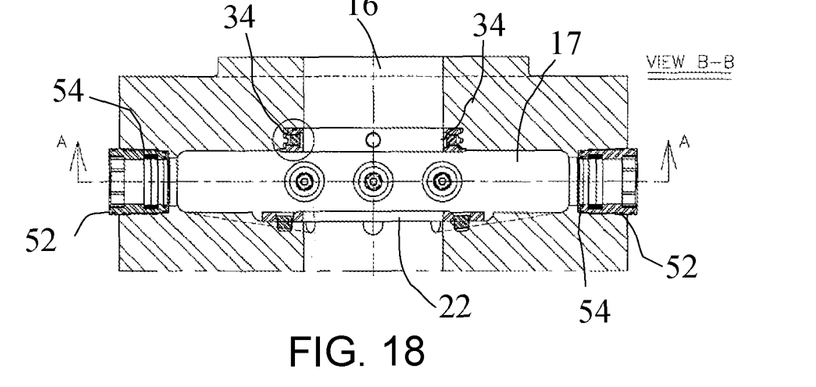
FIG. 18 is a side elevation view in section of an interior cavity of the blowout preventer with ram shaft seals installed.
Figure 19:
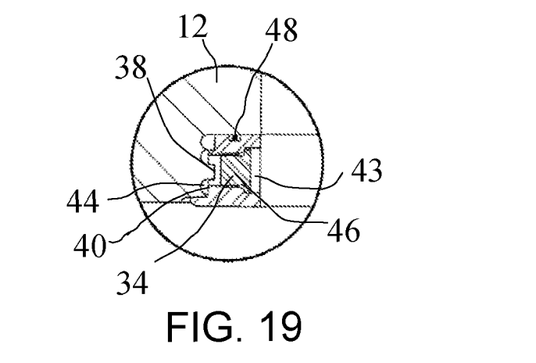
FIG. 19 is a detailed side elevation view of a ram block seal insert.
Figure 20:
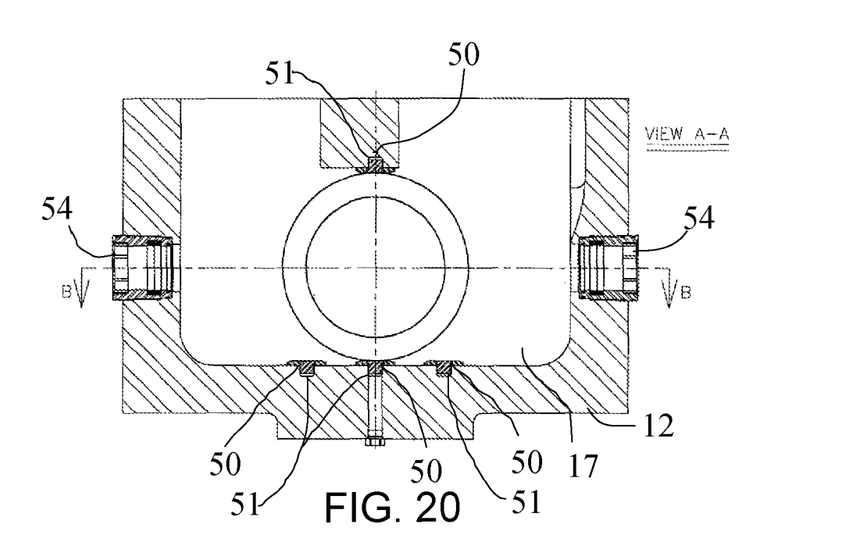
FIG. 20 is a detailed top plan view in section of an interior cavity of the blowout preventer with ram block guides.

Referring to FIG. 18 through 20, shows the seal insert 34 in detail. This insert 34 provides the surface that the rubber contained in the ram blocks 20 seals against to contain well bore pressure when they are in the closed position, as shown in FIGS. 9 and 10. While replaceable seats have been in use in the past, the attachment mechanism had flaws that produced many difficulties in use and replacement. Well fluids cause severe corrosion of the attachment parts and they are often difficult to remove. The present design provides a way to install and protect the attachment mechanism until it is desired to remove the seal insert 34.

Figure 11:
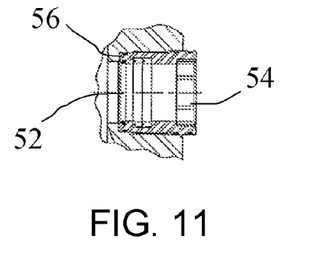
FIG. 11 is a detailed top plan view of a ram shaft seal.

Referring to FIG. 11, the body 12 is machined to receive the seal insert 34 by using a specially designed thread. The female thread 38 in the body 12 has a large root radius in the female portion. The seal insert 34 has a square profile thread 40 on the male portion. When screwed together, there remains a space 44 between the major diameter of the female thread 38 in the body 12 and the major diameter of the male thread 42 on the seal insert 34. In the depicted embodiment, intersecting the male thread 42 from the inside of the seal ring are four threaded plugholes 43 and plugs 46. The seal insert 34 also has an "o"-ring seal 48 on the topside to seal against the body 12. One advantage of using a thread as a means of attachment is that, when tightened, there is no extrusion gap for the "o"-ring 48. The seal ring 34 is rotated until it meets the body 12.

The threaded plugholes 43 serve two purposes. Firstly, they allow a way to attach an installation jig (not shown) for installation and removal of the seal ring 34. Secondly, they intersect the seal ring thread 38 to communicate with the space between the mating threads 38 and 40. The purpose of this feature is to inject a sealing/adhesive compound to fill the spaces between the seal ring 34 and the body 12. While a preferred embodiment has four threaded plugholes 44 to aid these processes, any number may be used. Once the seal ring 34 is installed and filled with a compound, such as a chemically inert two-part epoxy, plugs 46 are installed and covered with the compound. The installation is becomes permanent until such time as it is required to be removed. This process will be discussed further.

The advantages of this feature and its design are several. The ram blocks 20 and sealing rubbers installed in the ram blocks never contact the soft body material to cause wear or deterioration. The seal insert 34 is not a part of the pressure containing body 12 and therefore crack propagation from the seal ring 34 to the body 12 is eliminated. The seal insert 34 may then be hardened to provide greater wear resistance to abrasive fluids. In addition, when in use and subjected to pressure, the seal ring 34 experiences compressive loading which further reduces the possibility of cracking.

Ram Block Guides 50

Referring to FIG. 20, there are four ram block wear pads 50 installed on the internal sides of each gate 17 to prevent the ram blocks 20, shown in FIG. 4, from contacting the body 12. Because they are not part of the pressure containing body 12, they may be hardened to provide greater wear resistance to abrasive fluids. Ram block guides 50 are inserted into small cavities 51 in body 12.

Ram Shaft Seal Inserts 52

Figure 12:
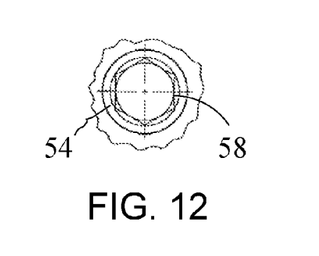
FIG. 12 is a detailed end elevation view of a ram shaft seal.
Figure 13:
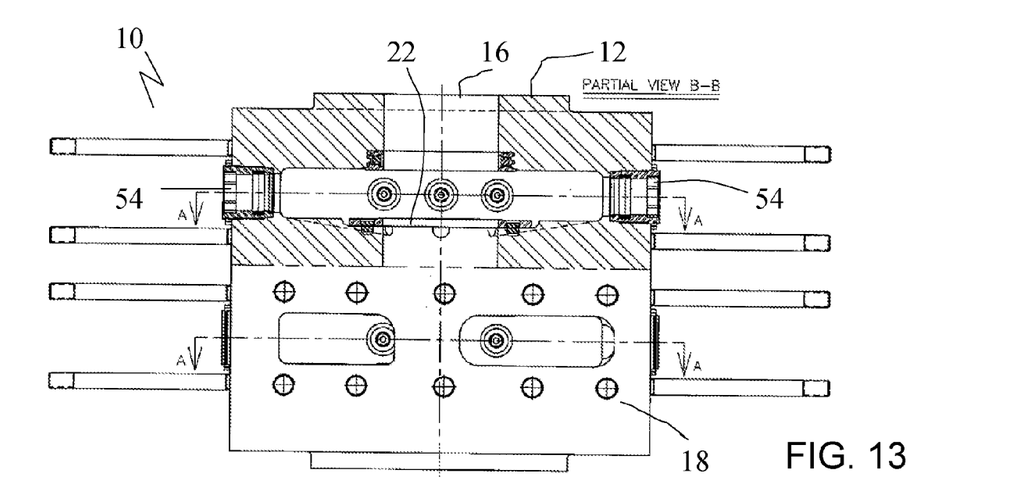
FIG. 13 is a side elevation view in partial section of the blowout preventer with the pressure plate and ram shafts removed.

Another common area of damage in a blowout preventer body 12 is in the area used to contain ram shaft seals 54. In the present design, referring to FIG. 18 through 20, the seals 54 are contained in a removable, threaded insert 52. The insert 52 may be made of a material that resists chemical attack, such as stainless steel. In this arrangement, the insert 52 is threaded into the body 12 and sealed on both sides of the thread 54 to ensure the area is kept clean and corrosion free. Additionally, sealing compounds may be used on the shouldering area 56 to further prevent exposure to corrosive chemical well fluids. The ram shaft seal insert 52 is installed and removed through the use of an internal hex 58, as shown in FIG. 12. Referring to FIGS. 18 and 20, the insert 52 is designed to protrude from the body 12 and provide a close fit sealing guide means for accurate alignment of the operator. This feature ensures the ram shaft is positioned properly so that it does not contact the inside portion of the ram shaft seal insert 52 and cause wear from usage.

Sealing/Adhesive Compounds

All of the inserted wear parts of this design contact the body 12 when installed, and are all threaded or bolted in place for installation. This means, however that steel on steel contact provides surfaces that may be wetted by corrosive fluids, such as salt water, and cause pitting corrosion of the mating steel surfaces. To eliminate this type of damage and further ensure the inserts remain installed properly without moving, a sealing/adhesive compound is preferably used to secure contacted surfaces. The sealing/adhesive compound fills the spaces between the mating steels and denies corrosive gases and liquids access to these critical surfaces. With both abrasion and chemical deterioration eliminated, the body 12 can be repaired by replacing worn parts instead of using welding processes.

Although there are many adhesives, the compound is preferably a two part chemical adhesive that allows ample time to install and secure each piece and has excellent chemical resistance to typical well bore fluids, including gases such hydrogen sulphide and condensates from formation fracturing fluids. It has an operating range from −60 to 300 deg. F, with intermittent use up to 350 deg. F. This range is sufficient to accommodate most well conditions.

Another feature of the sealing/adhesive compound is its ability to be removed when desired. The process requires a thermal cycle up to 600 deg. F. This temperature changes the adhesive to a carbon powder that may be easily removed with compressed air. This heat cycle is also advantageous to remove undesirable gases and hydrocarbons from all well bore exposed steel surfaces without affecting the steel parts.

Corrosion Protection

The sealing/adhesive compound protects mating surfaces from corrosive chemicals by filling the gaps between the mating surfaces. These gaps may only be as large as 0.015" thick to be 100% effective. To protect other exposed surfaces that do not have mating steel parts, a second compound is used as a sealant. It is also a two-part compound, however does not require a mating steel surface to be effective. Once the compound is mixed, it may be applied to clean bare steel. Once it has cured in place, it provides a protective barrier between the steel body and harsh well bore chemicals. It is also removed with the same thermal cycle as the sealing/adhesive compound.

Figure 8:
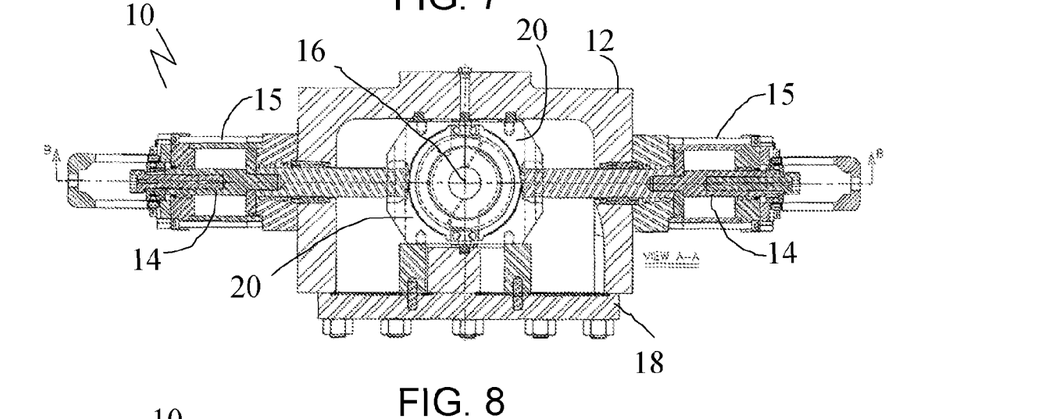
FIG. 8 is a top plan view in section of the blowout preventer in a closed position.

The blowout preventer body described above is intended to provide more wear resistant contact points between moving parts in an abrasive environment, such as the ram blocks 20 and the blowout preventer body 12, as they move from the open position shown in FIG. 4 to the closed position shown in FIG. 8. These contact points are generally the point at which most wear occurs. By including all wear inserts described above, the blowout preventer body 12 can be completely isolated from contact with any moving components. By providing more wear resistant surfaces, the time between servicing is increased, and the servicing requirements are reduces, as it is a relatively simple matter to remove and replace the wear inserts compared to the amount of work required to service a pressure vessel. The wear inserts are generally replaced at a predetermined service event, which may be triggered by visual inspection, a detector, a failure, or a certain amount of time passing.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A method of preventing wear in a blowout preventer, comprising the steps of:
   providing a blowout preventer comprising a blowout preventer body having an inner surface defining an inner cavity of the blowout preventer body and more than one ram received by the blowout preventer body within the inner cavity, the inner cavity having a top surface, a bottom surface opposite the top surface, and opposed side surfaces extending between the top and bottom surfaces, each ram being movable within the inner cavity relative to the blowout preventer body;
   forming a plurality of wear insert cavities in the inner surface of the blowout preventer body to receive one or more wear inserts at a plurality of wear points in the blowout preventer body, at least one wear insert cavity being formed in each of the top surface, the bottom surface, and the opposed side surfaces of the inner cavity; and
   securing wear inserts within the wear insert cavities in each of the top surface, the bottom surface, and the opposed side surfaces of the inner cavity, wherein the position of each wear insert is fixed relative to the blowout preventer body, at least a portion of each wear insert being received within the respective wear insert cavity;
   wherein the wear insert cavity comprises a wear plate cavity that forms a closed perimeter around a tubular bore that extends through the blowout preventer body and perpendicular to a travel path of a ram block, and securing at least one wear insert comprises securing a wear plate having an aperture that forms a closed perimeter around the tubular bore when installed in the wear plate cavity, the wear plate engaging a bottom surface of the ram block in the closed position, the wear plate having a lower portion and a raised portion, the raised portion raising the ram block above the lower portion as the ram block moves to the closed position into a sealing engagement with a seal above the ram block.

2. The method of claim 1, wherein the wear point is a contact point between a moving component and the blowout preventer body.

3. The method of claim 1, wherein one or more wear inserts are of a harder material than the blowout preventer body.

4. The method of claim 1, wherein securing at least one wear insert comprises using at least one of a pin connection and an adhesive.

5. The method of claim 1, wherein at least one of the wear plate cavity and the wear plate has flow channels to permit flow between the wear plate and the blowout preventer body.

6. A method of preventing wear in a blowout preventer, comprising the steps of:
   providing a blowout preventer comprising a blowout preventer body having an inner surface that forms an inner cavity and having a plurality of rams received by the blowout preventer body, the inner cavity having a top surface, a bottom surface opposite the top surface, and opposed side surfaces extending between the top and bottom surfaces, the bottom surface, being directed toward a wellhead attachment end of the blowout preventer, each ram being movable within the inner cavity relative to the blowout preventer body within the inner cavity;
   forming a threaded cavity in a top surface of the inner cavity that forms a closed perimeter around a tubular bore that extends through the blowout preventer body and perpendicular to a travel path of a ram block, the threaded cavity being formed in the inner surface of the blowout preventer body and sized to receive one or more wear inserts;
   providing a seal insert having a threaded outer surface and defines a central aperture; and
   threading the seal insert into the threaded cavity such that the central aperture forms a closed perimeter around the tubular bore, the seal insert being stationary relative to the blowout preventer body and engaging a top surface of the ram block as the ram block moves relative to the blowout preventer body and the seal insert to the closed position.

7. The method of claim 6, wherein the threaded cavity comprises a rounded thread and the seal insert comprises a square thread.

8. The method of claim 7, wherein the seal insert comprises at least one port for injecting a fill compound between the square thread and the rounded thread.

9. The method of claim 6, further comprising an elastomeric seal between the threaded cavity and the seal insert.

10. The method of claim 1, wherein the wear insert cavities in the opposed side surfaces of the inner cavity comprise guide cavities, and wherein securing wear inserts comprises inserting ram block guides into the guide cavities, the ram block guides engaging the sides of a ram block as it moves along at least a portion of the ram block travel path.

11. The method of claim 1, further comprising the step of forming a ram shaft seal cavity in an outer surface of the blowout preventer body and inserting a ram shaft seal into the ram shaft seal cavity, the ram shaft seal engaging the ram shaft as it moves relative to the blowout preventer body.

12. A blowout preventer, comprising:
   a blowout preventer body having an inner surface defining an inner cavity, the inner cavity having a top surface, a bottom surface opposite the top surface, and opposed side surfaces extending between the top and bottom surfaces, the inner surface comprising wear insert cavities formed in each of the top surface, the bottom surface, and the opposed side surfaces of the inner cavity at a plurality of wear points;
   a plurality of rams received by the blowout preventer body within the inner cavity, the rams being movable relative to the blowout preventer body; and
   wear inserts that are separate and distinct from the blowout preventer body secured in the wear insert cavities in each of the top surface, the bottom surface, and the opposed side surfaces of the inner cavity, wherein the position of each wear insert is fixed relative to the blowout preventer body, at least a portion of the wear insert being received within the wear insert cavity;
   wherein at least one wear insert cavity comprises a wear plate cavity that forms a closed perimeter around a tubular bore that extends through the blowout preventer body and perpendicular to a travel path of a ram block, and the corresponding wear insert is a wear plate having an aperture that forms a closed perimeter around the tubular bore when installed, the wear plate engaging a bottom surface of the ram block in the closed position, the wear plate having a lower portion and a raised portion, the raised portion raising the ram block above the lower portion as the ram block moves to the closed position into a sealing engagement with a seal above the ram block.

13. The blowout preventer of claim 12, wherein the wear point is a contact point between a moving component and the blowout preventer body.

14. The blowout preventer of claim 12, wherein one or more wear inserts are of a harder material than the blowout preventer body.

15. The blowout preventer of claim 12, wherein the at least one wear insert is secured using at least one of a pin connection and an adhesive.

16. The blowout preventer of claim 12, wherein at least one of the wear plate cavity and the wear plate have flow channels to permit flow between the wear plate and the blowout preventer body.

17. A blowout preventer, comprising:
a blowout preventer body;
at least one wear insert cavity comprising a threaded cavity that circumscribes a tubular bore above a travel path of a ram block and formed in an inner surface of the blowout preventer body;
a plurality of rams received by the blowout preventer body, the rams being movable relative to the blowout preventer body; and
at least one wear insert that is separate and distinct from the blowout preventer body secured in the at least one wear insert cavity on the formed inner surface of the blowout preventer body at a wear point, wherein the position of the at least one wear insert is fixed relative to the blowout preventer body, and the corresponding wear insert comprises a threaded seal insert, the threaded seal insert engaging a top surface of the ram block in the closed position.

18. The blowout preventer of claim 17, wherein the threaded cavity comprises a rounded thread and the seal insert comprises a square thread.

19. The blowout preventer of claim 18, wherein the seal insert comprises at least one port for injecting a fill compound between the square thread and the rounded thread.

20. The blowout preventer of claim 19, further comprising an elastomeric seal between the threaded cavity and the seal insert.

21. The blowout preventer of claim 12, wherein at least one wear insert cavity comprises guide cavities along the sides of a ram block travel path, and the corresponding wear inserts comprise ram block guides, the ram block guides engaging the sides of the ram block as it moves along at least a portion of the ram block travel path.

22. The blowout preventer of claim 12, further comprising a ram shaft seal cavity in an outer surface of the blowout preventer body and a ram shaft seal inserted into the ram shaft seal cavity, the ram shaft seal engaging the ram shaft as it moves relative to the blowout preventer body.

23. A method of preventing wear in a blowout preventer, comprising the steps of:
providing a blowout preventer comprising a blowout preventer body having an inner surface defining an inner cavity of the blowout preventer body and more than one ram received by the blowout preventer body within the inner cavity, the inner cavity having a top surface, a bottom surface opposite the top surface, and opposed side surfaces extending between the top and bottom surfaces, each ram being movable within the inner cavity relative to the blowout preventer body;
forming a plurality of wear insert cavities in the inner surface of the blowout preventer body to receive one or more wear inserts at a plurality of wear points in the blowout preventer body, at least one wear insert cavity being formed in each of the top surface, the bottom surface, and the opposed side surfaces of the inner cavity; and
securing wear inserts within the wear insert cavities in each of the top surface, the bottom surface, and the opposed side surfaces of the inner cavity, wherein the position of each wear insert is fixed relative to the blowout preventer body, at least a portion of each wear insert being received within the respective wear insert cavity;
wherein the wear insert cavity comprises a wear plate cavity that forms a closed perimeter around a tubular bore that extends through the blowout preventer body and perpendicular to a travel path of a ram block, and securing at least one wear insert comprises securing a wear plate having an aperture that forms a closed perimeter around the tubular bore when installed in the wear plate cavity, the wear plate engaging a bottom surface of the ram block in the closed position, and wherein at least one of the wear plate cavity and the wear plate has flow channels to permit flow between the wear plate and the blowout preventer body.

24. A blowout preventer, comprising:
a blowout preventer body having an inner surface defining an inner cavity, the inner cavity having a top surface, a bottom surface opposite the top surface, and opposed side surfaces extending between the top and bottom surfaces, the inner surface comprising wear insert cavities formed in each of the top surface, the bottom surface, and the opposed side surfaces of the inner cavity at a plurality of wear points;
a plurality of rams received by the blowout preventer body within the inner cavity, the rams being movable relative to the blowout preventer body; and
wear inserts that are separate and distinct from the blowout preventer body secured in the wear insert cavities in each of the top surface, the bottom surface, and the opposed side surfaces of the inner cavity, wherein the position of each wear insert is fixed relative to the blowout preventer body, at least a portion of the wear insert being received within the wear insert cavity;
wherein at least one wear insert cavity comprises a wear plate cavity that forms a closed perimeter around a tubular bore that extends through the blowout preventer body and perpendicular to a travel path of a ram block, and the corresponding wear insert is a wear plate having an aperture that forms a closed perimeter around the tubular bore when installed, the wear plate engaging a bottom surface of the ram block in the closed position;
and wherein at least one of the wear plate cavity and the wear plate have flow channels to permit flow between the wear plate and the blowout preventer body.

* * * * *

UNITED STATES PATENT AND TRADEMARK OFFICE
CERTIFICATE OF CORRECTION

PATENT NO.         : 9,121,246 B2                                      Page 1 of 1
APPLICATION NO.    : 12/853613
DATED              : September 1, 2015
INVENTOR(S)        : D. Foote It is certified that error appears in the above-identified patent and that said Letters Patent is hereby corrected as shown below:

| COLUMN | LINE | ERROR |
|---|---|---|
| (57) | Abstract Line 3 | "wear inserts at least one wear point" should read --wear inserts at at least one wear point-- |

Signed and Sealed this
Eighth Day of March, 2016

Michelle K. Lee
*Director of the United States Patent and Trademark Office*